United States Patent
Miura (10) Patent No.: US 7,159,389 B2
(45) Date of Patent: Jan. 9, 2007

(54) ENGINE FUEL INJECTION CONTROL APPARATUS

(75) Inventor: Manabu Miura, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 155 days.

(21) Appl. No.: 10/883,679

(22) Filed: Jul. 6, 2004

(65) Prior Publication Data

US 2005/0022517 A1     Feb. 3, 2005

(30) Foreign Application Priority Data

Jul. 31, 2003 (JP) .............................. 2003-283787

(51) Int. Cl.
*F01N 3/00* (2006.01)
(52) U.S. Cl. .......................... 60/295; 60/285
(58) Field of Classification Search ................ 60/285, 60/295, 282
See application file for complete search history.

(56) References Cited

U.S. PATENT DOCUMENTS

| | | | |
|---|---|---|---|
| 6,289,672 B1 * | 9/2001 | Katoh et al. .................. 60/285 |
| 6,378,297 B1 * | 4/2002 | Ito et al. ....................... 60/284 |
| 6,421,599 B1 * | 7/2002 | Lippa et al. ................. 701/102 |
| 6,519,934 B1 * | 2/2003 | Mashiki ....................... 60/285 |
| 6,681,744 B1 * | 1/2004 | Itoyama et al. ............. 123/480 |
| 6,684,630 B1 * | 2/2004 | Uchida et al. ................ 60/284 |
| 6,907,858 B1 * | 6/2005 | Miura ........................ 123/299 |

FOREIGN PATENT DOCUMENTS

| | | | |
|---|---|---|---|
| DE | 10030936 A1 | 1/2002 |
| DE | 10234849 A1 | 7/2002 |
| EP | 0987425 A1 | 3/2000 |
| EP | 987425 A1 * | 3/2000 |
| EP | 1262651 A2 * | 12/2002 |
| EP | 1262651 A2 | 12/2002 |
| JP | 2003-129890 | 5/2003 |

* cited by examiner

*Primary Examiner*—Thomas Denion
*Assistant Examiner*—Loren Edwards
(74) *Attorney, Agent, or Firm*—Global IP Counselors (57) ABSTRACT

An engine fuel injection control apparatus is configured to alleviate the torque fluctuation that occurs due to deviation of the fuel injection timing from the optimum value when the excess air ratio is changed suddenly from lean to rich, such as when a NOx trapping catalytic converter is subjected to desorption and deoxidation treatment. When the excess air ratio changes by a large amount, the fuel injection timing is adjusted so as to change in accordance with the actual excess air ratio by executing an interpolation calculation based on the target excess air ratio and the actual excess air ratio. During the transient period when the actual excess air ratio is converging toward the target excess air ratio, the fuel injection timing is changed in accordance with the change in the actual excess air ratio and can therefore be set appropriately in relation to the actual excess air ratio. As a result, it is possible to alleviate torque fluctuation by suppressing the effect of the fuel injection timing to change rapidly in a step-like manner between target values before and after the excess air ratio changes.

13 Claims, 8 Drawing Sheets

Target Inj. Timing in Lean Conditions

Fig. 6

Target Inj. Timing in Rich Conditions

Fig. 7

Target Lambda in Lean Conditions

Fig. 8

Target Lambda in Rich Conditions

ENGINE FUEL INJECTION CONTROL APPARATUS

BACKGROUND OF THE INVENTION

1. Field of the Invention

The present invention generally relates to an engine fuel injection control apparatus. More specifically, the present invention relates to a fuel injection control apparatus configured to execute a fuel injection timing to alleviate the torque fluctuation that occurs due to deviation of the fuel injection timing from the optimum value when the excess air ratio is changed suddenly from lean to rich.

2. Background Information

In internal combustion engines such as diesel engines, an exhaust gas recirculating system (EGR system) is widely used wherein a part of the exhaust gas is recirculated to lower the combustion temperature in order to reduce discharge of nitrogen oxide (NOx). Some prior exhaust systems for diesel engines often include a diesel particulate filter (DPF) and a NOx trapping catalytic converter that are disposed in an exhaust passage. The diesel particulate filter (DPF) traps particulate matters (PM) in the exhaust gas, while the NOx trapping catalytic converter traps NOx in the exhaust gas when an air-fuel ratio in the exhaust gas is in a lean range and purifies the trapped NOx when the air-fuel ratio is in a rich range.

Thus, an engine having a NOx trapping catalytic converter normally operates with lean combustion and the NOx generated during that operation are captured in a NOx absorbing agent. When a certain amount of NOx has accumulated, the excess air ratio $\lambda$ of the exhaust gas is temporarily changed to a rich value to desorb and deoxidize the NOx from the absorbing agent. This control of the excess air ratio $\lambda$ of exhaust gas being recirculated that temporarily shifts the value of the excess air ratio $\lambda$ to a rich value is called "rich spike control."

Diesel engines are normally operated with an excess air ratio $\lambda$ of approximately 2 to 3, which corresponds to a lean air fuel ratio. During rich spike control, the value of the excess air ratio $\lambda$ is changed to approximately 0.8. Rich spike control is normally executed with non-regular timing in response to engine operating conditions to treat the NOx accumulated in the NOx trapping catalytic converter. In other words, rich spike control is not executed in response to a request that is issued by the driver. Consequently, the driver will experience a feeling of discomfort if the torque fluctuates during the shift from the normal operating state to the rich spike control state. Therefore, in order to reduce the value of the excess air ratio $\lambda$ while changing the fuel delivery quantity as little as possible, the rich spike control is designed to reduce the quantity of intake gas by reducing the opening degree of a throttle valve provided in an intake passage. An example of a diesel engine configured to control the fuel injection timing in accordance with engine operating state has been disclosed in Japanese Laid-Open Patent Publication No. 2003-129890.

In view of the above, it will be apparent to those skilled in the art from this disclosure that there exists a need for an improved engine fuel injection control apparatus. This invention addresses this need in the art as well as other needs, which will become apparent to those skilled in the art from this disclosure.

SUMMARY OF THE INVENTION

It has been discovered that one factor determining the optimum fuel injection timing is the excess air ratio and the precision with which the fuel injection timing can be controlled greatly affects various aspects of the engine performance, particularly in engines that operate in a wide range of excess air ratios as a measure to improve exhaust emissions and fuel economy.

Considering the case in which an engine is operated with a lean combustion using an excess air ratio of 2 or higher during a normal steady state operation, and with a rich combustion using an excess air ratio in the vicinity of 1 during acceleration only. During the transient period when the excess air ratio is rapidly changing, the optimum fuel injection timing changes greatly. Conventionally, the fuel injection timing has been changed in accordance with the change in the target excess air ratio, but this approach leaves the possibility that the fuel injection timing will deviate from the optimum fuel injection timing during said transient period. This deviation occurs because the fuel injection timing changes quickly to the target value in accordance with the engine operating state while the actual excess air ratio changes in a delayed manner due to the delay associated with the transport of the intake air. The error in the fuel injection timing causes torque fluctuation to occur.

If such torque fluctuation occurs while the vehicle is accelerating, there is little chance that the driver will notice and the operating performance will not be damaged. However, when the engine designed to be controlled to a rich excess air ratio in order to regenerate a NOx trapping catalytic converter and/or an exhaust fine particle filter (DPF), the regeneration control is executed based on a request from the engine, not based on the wishes of the driver, and can therefore be executed under steady state operating conditions as well. When the regeneration control is executed under steady state operating conditions, the torque fluctuation resulting from the change in the pilot fuel injection timing will be readily noticeable to the driver.

In view of the forgoing, an engine fuel injection control apparatus is provided for an engine that basically comprises an excess air ratio control section, a fuel injection timing control section, a fuel injection timing control section, an actual excess air ratio computing section and a fuel injection timing adjustment section. The excess air ratio control section is configured to control an excess air ratio to a target excess air ratio that is determined based on an engine operating condition of the engine. The fuel injection timing control section is configured to control a fuel injection timing to a target fuel injection timing that is determined based on the engine operating condition. The actual excess air ratio computing section is configured to compute an actual excess air ratio of the engine. The fuel injection timing adjustment section is configured to adjust the fuel injection timing to obtain an adjusted fuel injection timing based on the actual excess air ratio that was computed when an amount of adjustment in the target excess air ratio is larger than a prescribed value.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
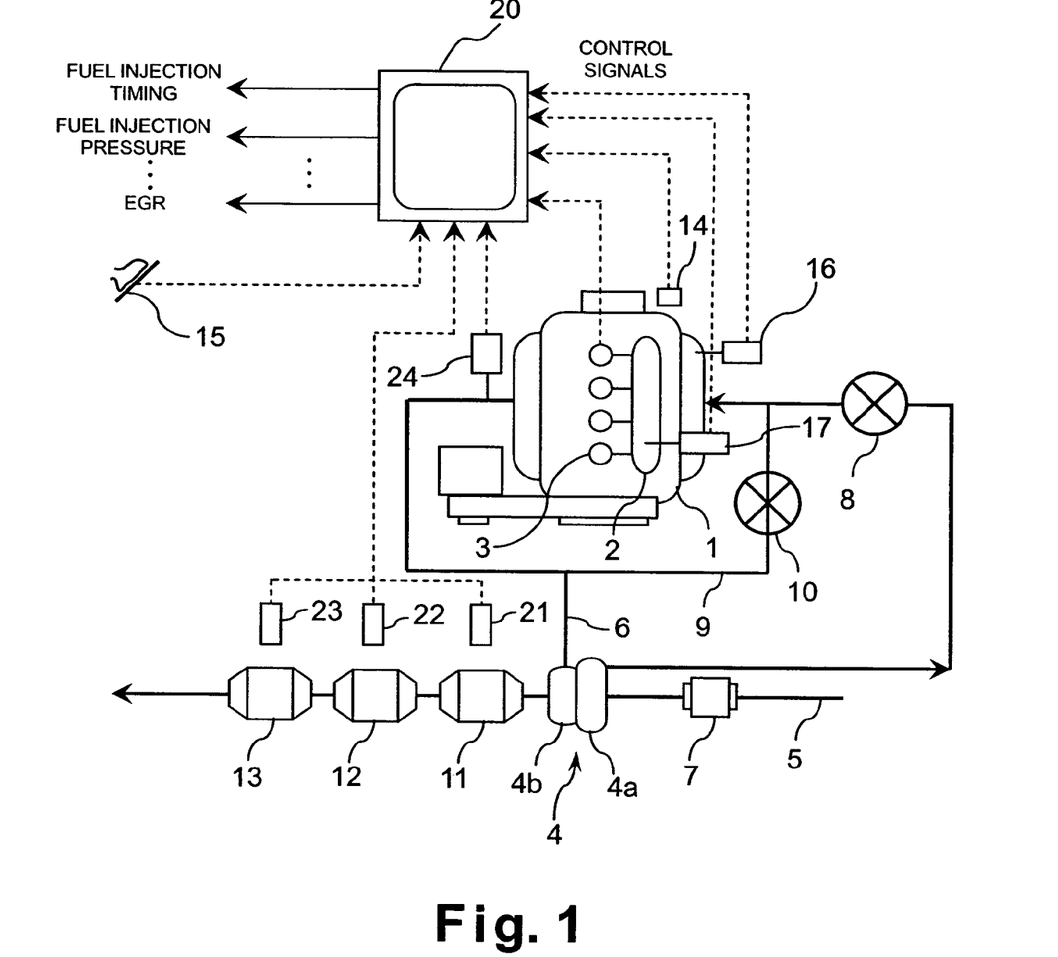
FIG. 1 is a diagrammatic view of an engine fuel injection control apparatus or system for an internal combustion engine, e.g., a diesel engine, in accordance with one embodiment of the present invention.

Referring initially to FIG. 1, an engine fuel injection control apparatus or system is illustrated for an internal combustion engine such as a supercharged diesel engine 1 in accordance with a first embodiment of the present invention. The engine fuel injection control apparatus or system in accordance with the present invention can be applied to other internal combustion engines used in automobiles and the like.

As shown in to FIG. 1, the engine 1 includes a common rail fuel injection system including a common rail 2, a plurality of fuel injection valves 3, and a high-pressure fuel pump (not shown) so as to be supplied with pressurized fuel. The fuel pump (not shown) pumps fuel to the common rail 2, where the pressurized fuel accumulates, and high-pressure fuel is delivered to the inside of the combustion chambers when the fuel injection valves 3 are opened. Thus, the fuel injection valves 3 inject fuel directly into respective combustion chambers (not shown) of each cylinder.

The fuel injection valves 3 are configured and arranged to execute a pilot injection before the main injection or executing a post-injection following the main injection. By changing the accumulation pressure of the common rail 2, the fuel injection pressure can be controlled in a variable manner.

A turbocharger (supercharger) 4 having a compressor 4a is arranged in an air intake passage 5 of the air intake system. The compressor 4a serves to pressurize the intake air. The compressor 4a is rotated by a turbine 4b that is driven by exhaust gas flowing through an exhaust passage 6. The supercharger 4 is positioned downstream of an air flow meter 7 in the air intake passage 5 of the engine 1. Preferably, the supercharger 4 is a variable-capacity type supercharger having a variable nozzle provided on the turbine 4b. By using a variable-capacity type supercharger 4, the variable nozzle can be constricted when the engine 1 is operating in a low speed region to increase the turbine efficiency. The variable nozzle of the supercharger 4 can be opened when the engine 1 is operating in a high speed region to increase the turbine capacity. Thus, this arrangement enables a high supercharging effect to be obtained over a wide range of operating conditions.

An intake air throttle valve 8 is installed inside the air intake passage 5 at a location downstream of the compressor 4a. The intake air throttle valve 8 serves as an intake air regulating device to make it possible to control the quantity of intake air drawn into the engine 1. The intake air throttle valve 8 is, for example, an electronically controlled throttle valve whose opening degree can be varied freely using a stepper motor.

The exhaust passage 6 is provided with an exhaust gas recirculation (EGR) passage 9 that branches from a position between the engine 1 and the turbine 4b. The EGR passage 9 connects to the air intake passage 5 downstream of the intake air throttle valve 8.

The exhaust system is provided with an exhaust gas recirculation (EGR) control valve 10 that is installed in the EGR passage 9. The EGR valve 10 serves to control the exhaust gas recirculation quantity in accordance with the engine operating conditions. The EGR valve 10 is electronically controlled using a stepper motor such that the opening degree of the EGR valve 10 regulates the flow rate of the exhaust gas recirculated to the air intake system, i.e., the EGR quantity drawn into the engine 1. Preferably, the EGR valve 10 is feedback (closed-loop) controlled to regulate the EGR quantity in such a manner as to achieve an EGR ratio set in accordance with the operating conditions. Basically, the EGR ratio can be feedback controlled by comparing a target intake air quantity to the actual intake air quantity that is measured and outputted by the air flow meter 7.

The exhaust system is also provided with an oxidation catalytic converter 11 having an HC adsorbing function, a NOx trapping catalytic converter 12 having a NOx trapping function, and an exhaust gas fine particle capturing filter (DPF=diesel particulate filter) 13 arranged in sequence in the exhaust passage 6 at a position downstream of the turbine 4b of the turbocharger 4.

The oxidation catalytic converter 11 has the characteristic of adsorbing exhaust HCs when the temperature is low and releasing the HCs when the temperature is high and it functions to oxidize HCs and CO when in an active state. The NOx trapping catalytic converter 12 adsorbs or traps NOx contained in the exhaust gas when the excess air ratio $\lambda$ is greater than 1, i.e., when the air fuel mixture is lean, and releases the NOx when the excess air ratio $\lambda$ is rich. The NOx trapping catalytic converter 12 also functions to deoxidize the NOx when in an active state. The particulate filter 13 captures fine particles (PM=particulate matter) contained in the exhaust gas and the captured PM is combusted by raising the exhaust gas temperature using regeneration control.

A control unit 20 is provided to control the exhaust gas cleaning apparatus of the present invention. In particular, the control unit 20 determines and sets the intake air quantity Qa, the fuel injection quantity Qf and the injection timing IT based on detection signals from various sensors (described below) that serve to detect the operating state of the engine 1 and executes the controls based on these signals. Thus, the control unit 20 also controls the drive of the fuel injection valves 3, controls the opening degree of the intake throttle valve 8 and the EGR valve 10 in response to detection signals from various sensors (described below).

The control unit 20 is a microcomputer comprising of a central processing unit (CPU) and other peripheral devices. The control unit 20 can also include other conventional components such as an input interface circuit, an output interface circuit, and storage devices such as a ROM (Read Only Memory) device and a RAM (Random Access Memory) device. The control unit 20 preferably includes an engine control program that controls various components as discussed below. The control unit 20 receives input signals from various sensors (described below) that serve to detect the operating state of the engine 1 and executes the aforementioned controls based on these signals. It will be apparent to those skilled in the art from this disclosure that the precise structure and algorithms for the control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

In the present invention, as explained below, the fuel injection timing is adjusted by the control unit 20 based on the actual excess air ratio $\lambda r$ when the change in the excess air ratio changes by a large amount. As a result, the fuel injection timing can be controlled to a timing that is optimum with respect to the actual excess air ratio $\lambda r$. With the present invention, during the transient period when the actual excess air ratio $\lambda r$ is converging toward the target excess air ratio $\lambda t$, the fuel injection timing is changed in accordance with the change in the actual excess air ratio $\lambda r$ and can therefore be set appropriately in relation to the actual excess air ratio $\lambda r$. As a result, it is possible to avoid torque fluctuations and declines in engine performance caused by error resulting from intake air transport delay during the transient period.

The intake air quantity Qa is detected by the air flow meter 7, which outputs a signal to the control unit 20 that is indicative of the intake air quantity Qa. The control unit 20 is also operatively coupled to a rotational speed sensor 14, an accelerator position sensor 15, an engine coolant temperature sensor 16, a rail pressure sensor 17, a plurality of exhaust system temperature sensors 21, 22 and 23, and an exhaust gas sensor or oxygen sensor 24. The rotational speed sensor 14 is configured and arranged to detect the engine rotational speed Ne of the engine 1, and output a signal to the control unit 20 that is indicative of the engine rotational speed Ne of the engine 1. The accelerator position sensor 15 is configured and arranged to detect the accelerator position APO, and output a signal to the control unit 20 that is indicative of the accelerator position APO.

The coolant temperature sensor 16 is configured and arranged to detect the temperature of the engine coolant Tw, and output a signal to the control unit 20 that is indicative of the temperature of the engine coolant Tw. The rail pressure sensor 17 is configured and arranged to detect the fuel pressure (fuel injection pressure) inside the common rail 2, and output a signal to the control unit 20 that is indicative of the fuel pressure (fuel injection pressure) inside the common rail 2. The temperature sensors 21, 22 and 23 are configured and arranged to detect the exhaust gas temperature in the general vicinity of the outlets of the oxidation catalytic converter 11, the NOx trapping catalytic converter 12, and the particulate filter 13, respectively. The temperature sensors 21, 22 and 23 are configured and arranged to output signals to the control unit 20 that are indicative of the exhaust gas temperature in the general vicinity of the outlets of the oxidation catalytic converter 1, the NOx trapping catalytic converter 12, and the particulate filter 13, respectively. The exhaust gas sensor 24 is configured and arranged in the exhaust passage 6 at a position upstream of the turbine 4b to detect the air fuel ratio or the oxygen concentration of the exhaust gas. The exhaust gas sensor 24 is configured and arranged to output a signal to the control unit 20 that is indicative of the air fuel ratio or the oxygen concentration of the exhaust gas.

Accordingly, the control unit 20 controls the regeneration of the NOx trapping catalytic converter 12 and the particulate filter 13. The control unit 20 sets the fuel injection quantity Qf and the fuel injection timing IT based on the detection signals from the various sensors and controls how the fuel injection valves 3 are driven. The control unit 20 also controls the opening degrees of the intake air throttle valve 8 and the EGR valve 10. The control unit 20 also controls the opening degrees of the intake air throttle valve 8 and the EGR valve 10 in accordance with various engine operating conditions. In other words, the control unit 20 controls the fuel injection valves 3 to adjust the fuel injection quantity Qf delivered by the fuel injection valves 3, controls the fuel injection valves 3 to adjust the injection timing IT of the fuel injection valves 3, and controls the intake air throttle valve 8 and the EGR valve 10 to adjust the intake air quantity Qa. The control unit 20 is also operated in accordance with various engine operating conditions (e.g., accelerator position).

The control unit 20 further controls the regeneration of the NOx trapping catalytic converter 12 by determining when the total NOx absorbed to the NOx trapping catalytic converter 12 has reacted a prescribed value and, when the prescribed value is reached, executing regeneration control to shift the excess air ratio $\lambda$ to a rich value and thereby desorb and deoxidize the NOx. In particular, as relates to the present invention, the control unit 20 executes rich spike control to regenerate (i.e., desorb the NOx of) the NOx trap catalyst 12 and fuel injection timing control.

The control unit 20 further controls the regeneration of the particulate filter 13 by executing regeneration control to raise the exhaust gas temperature and thereby combust/remove the particulate matter when the amount of particulate matter captured in the particulate filter 13 has reached a prescribed amount.

Figure 2:
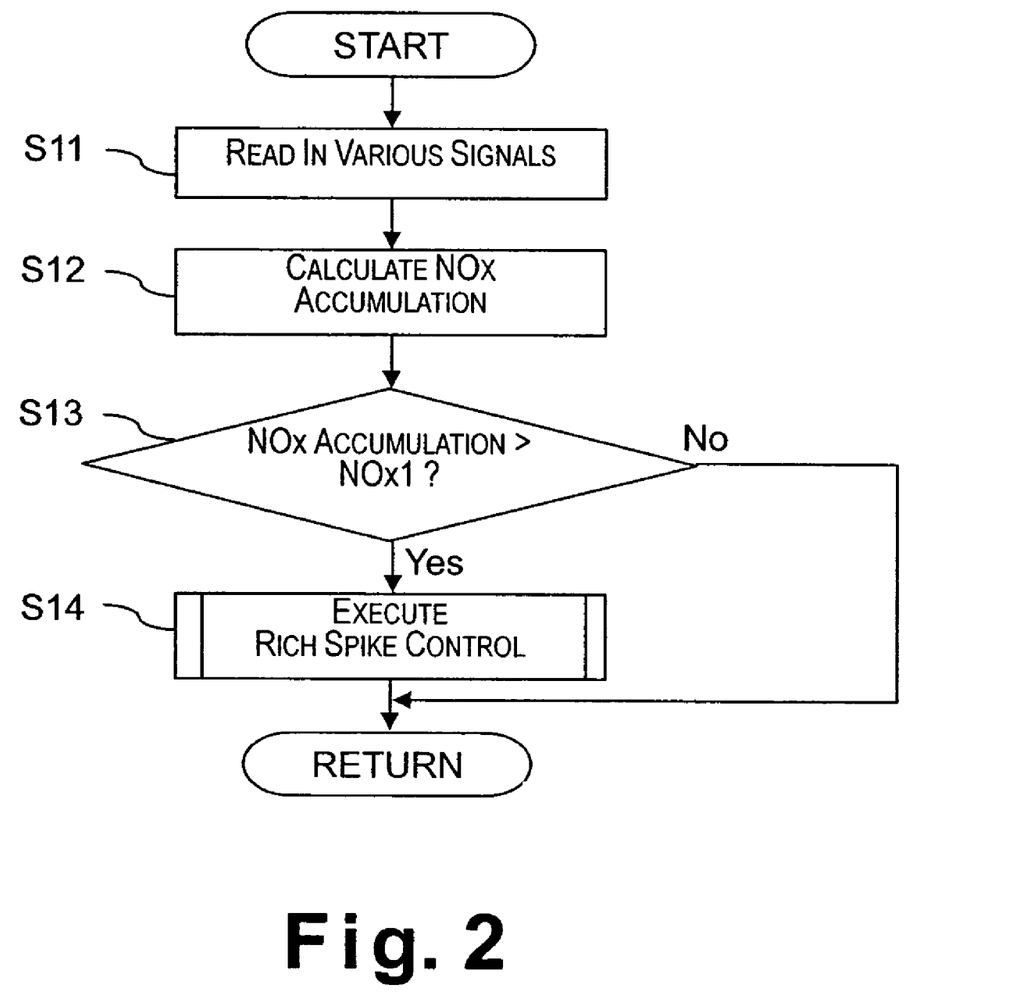
FIG. 2 is a first flowchart showing the control operations executed by the control unit of the engine fuel injection control apparatus or system in accordance with the present invention in order to determine when to regenerate the NOx trapping catalytic converter.
Figure 3:
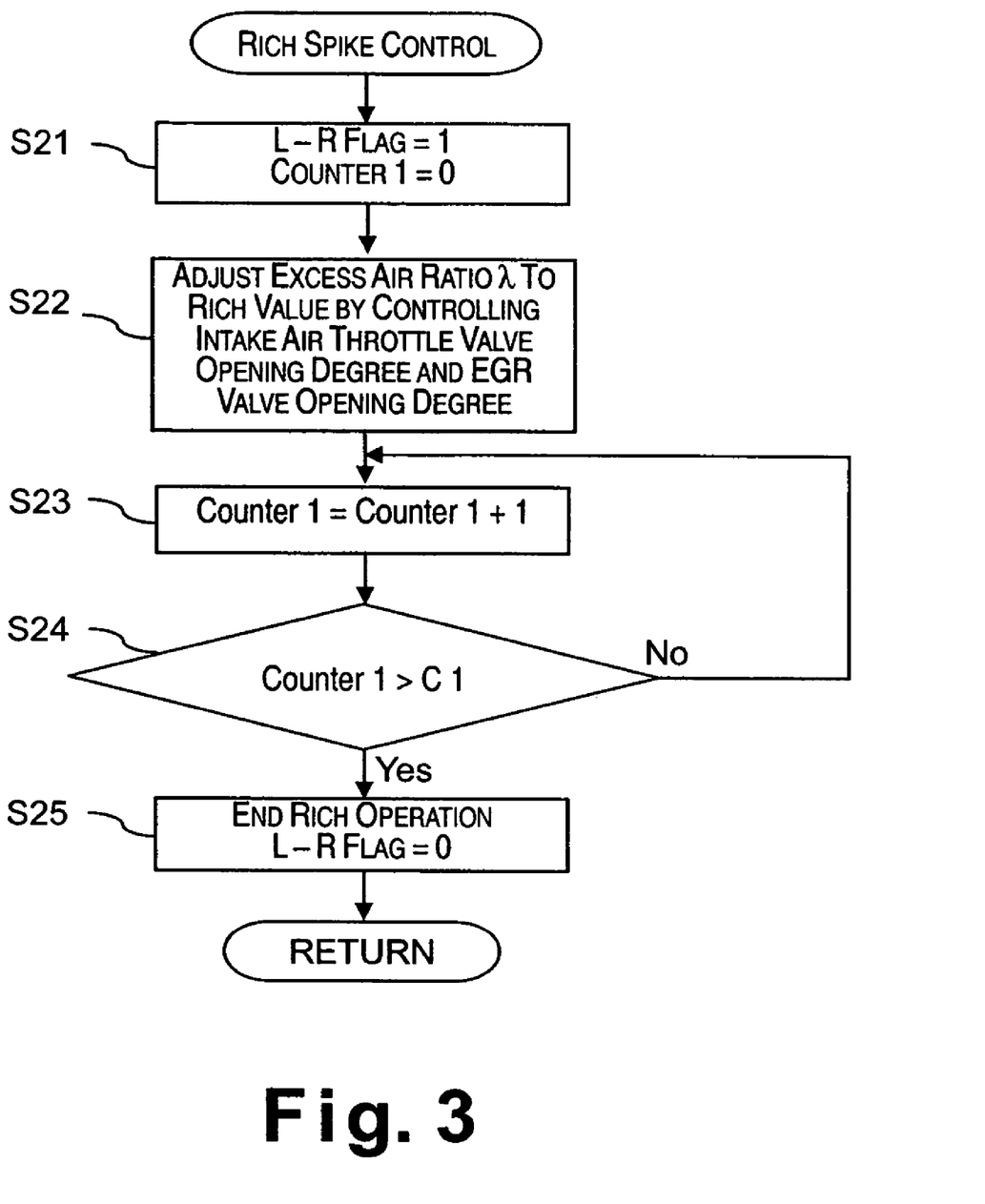
FIG. 3 is a second flowchart showing the control operations of the rich spike control executed by the control unit of the engine fuel injection control apparatus or system in accordance with the present invention in order to regenerate the NOx trapping catalytic converter.
Figure 4:
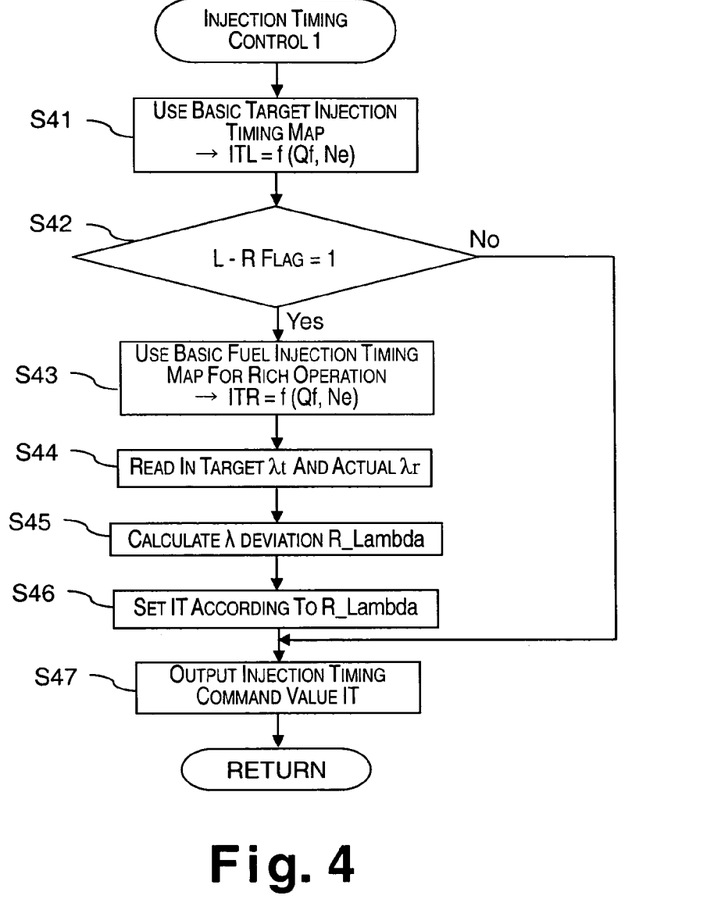
FIG. 4 is a third flowchart showing the control operations of the fuel injection timing adjustment control executed by the control unit of the engine fuel injection control apparatus or system in accordance with the present invention when the excess air ratio is changing rapidly.

As shown in FIGS. 2 to 4, the control routines are shown for the excess air ratio control and the fuel injection timing control to be executed by the control unit 20. In relation to the present invention, the control unit 20 carries out the functions of the excess air ratio control section, the fuel injection timing control section, the actual excess air ratio computing section, and the fuel injection timing adjustment section. In particular, the control unit 20 executes the excess air ratio control as an example of rich spike control, which serves to temporarily shift the excess air ratio to a rich value and thereby desorb and deoxidize the NOx that is adsorbed to the NOx trapping catalytic converter 12 while the engine was operating with lean combustion.

These control routines of FIGS. 2 to 4 are periodically executed in a cyclic manner at a prescribed fixed time interval when the engine 1 is operating in accordance with certain predetermined engine operating conditions, e.g., when the engine 1 is operating in a low-load, low-speed state, including idling. Now, the control routines of FIGS. 2 to 4 will be discussed for the executing the rich spike control and the fuel injection timing control by the control unit 20.

In step S11, the control unit 20 reads in various signals from each of the sensors shown in FIG. 1 that represent engine operating conditions including, but not limited to, the engine rotational speed Ne, the accelerator position APO, the fuel injection quantity, and the engine coolant temperature. In other words, the engine operating state, e.g., load condition and rotational speed condition, of the engine 1 is determined by the control unit 20 receiving signals from each of the sensors shown in FIG. 1.

In step S12, the control unit 20 calculates the amount of NOx accumulated (adsorbed) in the NOx trapping catalytic converter 12 using theses signals from the sensors of FIG. 1. There are various known methods of calculating the NOx accumulation amount. For example, the NOx quantity can be estimated based on signals indicating such operating conditions as the engine rotational speed Ne, the fuel injection quantity Qf, and the coolant temperature Tw and/or the NOx accumulation amount can be calculated by integrating the NOx quantity in accordance with the operation history.

In step S13, the control unit 20 compares the calculated NOx accumulation amount to a reference value NOx1. If the NOx accumulation amount is equal to or less than NOx1, then the control unit 20 ends the current cycle of the routine without performing the rich spike control. If the control unit 20 determines the NOx accumulation amount is greater than NOx1, then the control unit 20 proceeds to step S14 where it executes the rich spike control routine.

FIG. 3 shows the rich spike control routine. In step S21, the control unit 20 sets the L-R flag to 1 to indicate the shift to rich combustion and initializes the value of Counter1, which is a counter for managing the amount of time over which rich spike control is executed. The initial value of the L-R flag is set to 0.

In step S22, the control unit 20 executes control to reduce the opening degrees of the intake air throttle valve 8 and the EGR valve 10 in order to control the excess air ratio $\lambda$ of the engine 1 to a rich value below the stoichiometric excess air ratio. In some cases, to satisfy the need to achieve the target excess air ratio $\lambda t$, a post injection is executed in order to add fuel during the period between late in the combustion stroke and the exhaust stroke. The NOx that accumulated in the NOx trapping catalytic converter 12 while the engine operated with lean combustion using a large excess air ratio $\lambda$ is desorbed from the NOx absorbing agent due to the enriched excess air ratio value resulting from the rich spike control, and the desorbed NOx is cleaned by the deoxidizing treatment that occurs in the catalyst.

In step S23, the control unit 20 increments the value of Counter1, while in step S24 the control unit 20 determines if the resulting value of Counter1 is larger than a reference value C1. The reference value C1 is set based on the NOx accumulation amount computed in the processing routine shown in FIG. 2. The rich spike control continues until the value of Counter1 is greater than the value of C1. When the value of Counter1 is greater than C1, the control unit 20 proceeds to step S25 where it ends the rich operation and resets the value of the L-R flag. Then, the control unit 20 executes such end processing as initializing the NOx accumulation amount and returns to the routine shown in FIG. 2.

Figure 6:
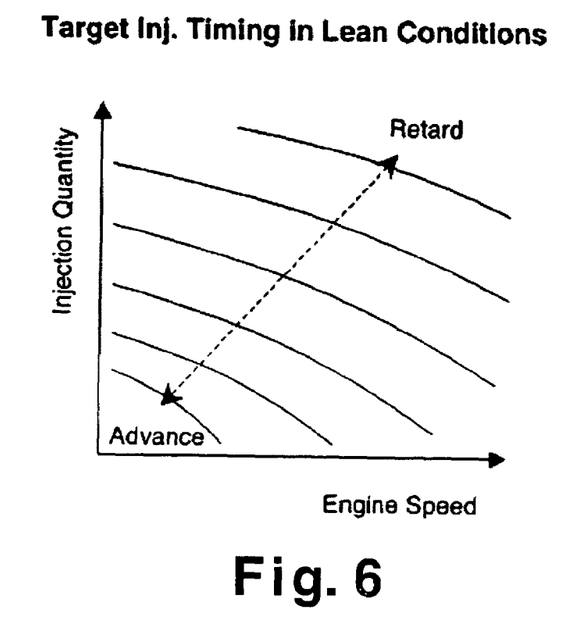
FIG. 6 is a first lean target injection timing map configured to provide a lean target value corresponding to lean operation.

The fuel injection timing control will now be described with reference to FIG. 4. First, in step S41, the control unit 20 sets the basic target injection timing value ITL for lean operation (i.e., normal operation in which the value of excess air ratio $\lambda$ is not controlled to a rich value, e.g., rich spike control) based on the engine operating state. The basic target injection timing value ITL is set by, for example, searching a pre-stored map that gives the basic target injection timing value ITL based on the fuel injection quantity Qf and the engine rotational speed Ne. The basic target injection timing value for lean operation is provided by the injection timing map illustrated in FIG. 6. In particular, the injection timing map of FIG. 6 is a first lean target injection timing map that is configured to provide a lean target value corresponding to lean operation.

Steps S42 to S47 of the control unit 20 constitutes a part of a fuel injection timing adjustment section that is configured to adjust the fuel injection timing to obtain an adjusted fuel injection timing based on the actual excess air ratio that was computed when an amount of adjustment in the target excess air ratio is larger than a prescribed value. In step S42, the control unit 20 checks the status of the L-R flag to determine if rich spike control is in progress. If the L-R flag is 0, then the engine 1 is in a normal lean operating state and the control unit 20 skips step S43 and proceeds to step S47, where it outputs the basic target injection timing value ITL for lean operation.

Thus, in step S42, the control unit 20 determines if the amount of adjustment in the target excess air ratio is larger than a prescribed value, e.g., a sudden change in the excess air ratio $\lambda$ of approximately 0.8. For example, when the engine enters the rich spike control state, the value of the L-R flag is set to 1, because the excess air ratio $\lambda$ suddenly decreases from a lean value of between 2 and 3, for example, to a rich value of approximately 0.8.

Figure 7:
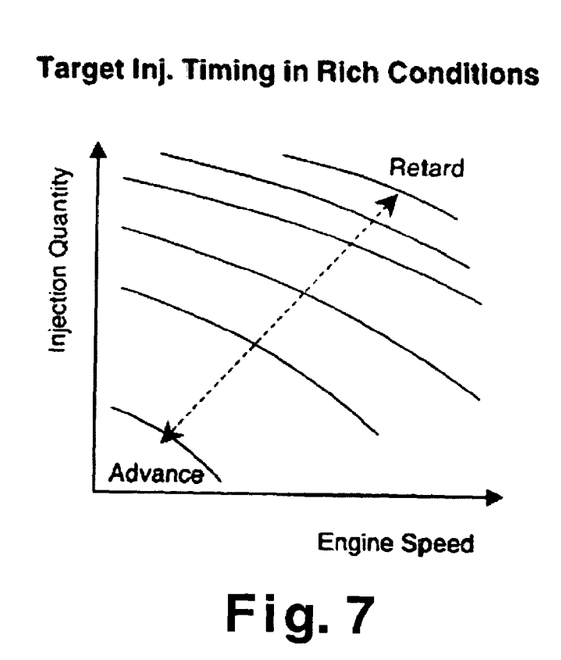
FIG. 7 is a second rich target injection timing map configured to provide a rich target value corresponding to the engine operating condition for rich operation.

In step S43, the control unit 20 sets a basic target injection timing value ITR for rich operation based on the engine operating state. The basic target injection timing value ITR for rich operation is set using the map of FIG. 7 in the same manner as when the basic target injection timing value ITL is set for lean operation. In other words, the injection timing map of the FIG. 7 is a second rich target injection timing map that is configured to provide a rich target value corresponding to the engine operating condition for rich operation. The basic target injection timing value ITR used for rich operation is more advanced than the basic target fuel injection timing value ITL used for lean operation. In other words, the lean operation and rich operation maps are configured such that the injection timing is more advanced during rich operation than during lean operation in order to improve the ignitability.

Figure 8:
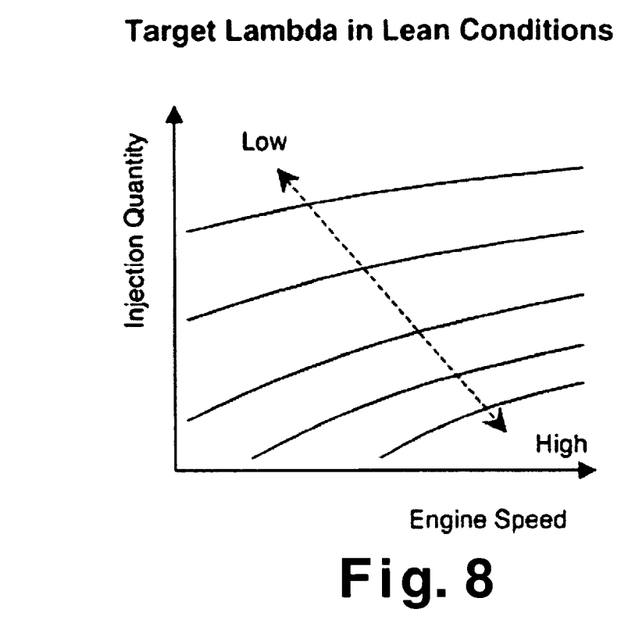
FIG. 8 is a first excess air ratio map configured to provide a lean target value corresponding to the engine operating condition for lean operation.
Figure 9:
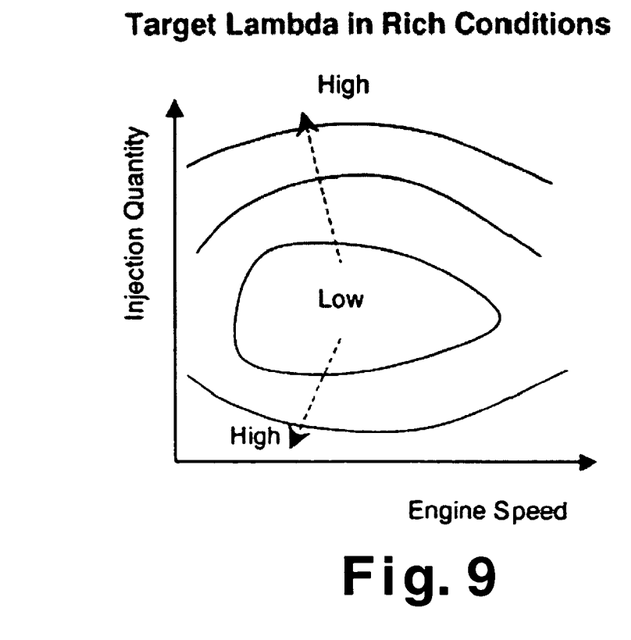
FIG. 9 is a second excess air ratio map configured to provide a rich target value corresponding to the engine operation condition for rich operation.

In step S44, the control unit 20 reads in the current actual excess air ratio λr and the target excess air ratio λt values for both before and after the excess air ratio λ changes. In other words, there are two target excess air ratios λt (one for lean operation and one for rich operation) that are used for the excess air ratio control. Thus, each target value is obtained by searching a pre-stored map (FIGS. 8 and 9) that gives the target excess air ratios λt based on the engine operating condition or state (similarly to the manner in which the basic injection timing is found using a map). FIG. 8 illustrates a first lean target excess air ratio map configured to provide a lean target value corresponding to the engine operating condition for lean operation, while FIG. 9 illustrates a second rich target excess air ratio map configured to provide a rich target value corresponding to the engine operation condition for rich operation. The actual excess air ratio λr is either detected using a fuel air ratio sensor 24 or computed based on such factors as the intake air quantity and the fuel injection quantity of the engine 1.

In steps S45 to S46, the control unit 20 finds the excess air ratio deviation R_Lambda based on the rich and lean target excess air ratios λt and the actual excess air ratio λr obtained in step S44 and calculates the fuel injection timing command value IT using the excess air ratio deviation R_Lambda and the basic target fuel injection timings values ITL and ITR.

Figure 5:
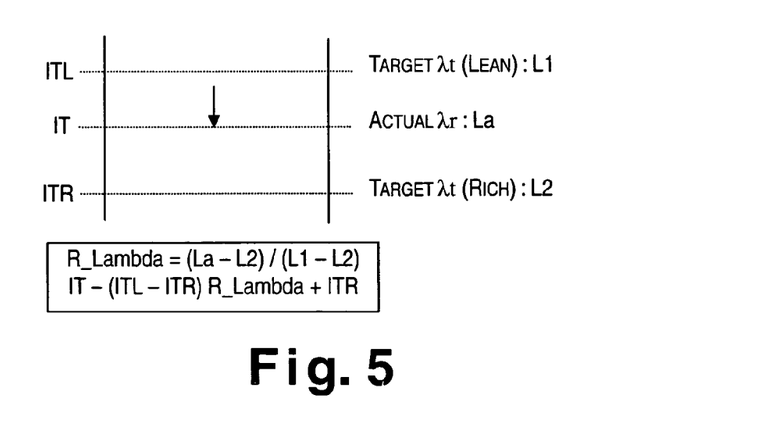
FIG. 5 illustrates a method used by the engine fuel injection control apparatus or system in accordance with the present invention to adjust the fuel injection timing when the excess air ratio is changing rapidly.

An example of a method of calculating the command value IT will now be described with reference to FIG. 5. First, the excess air ratio deviation R_Lambda is found as a ratio of La with respect to L1 and L2, where the term La is the actual excess air ratio λr and the terms L1 and L2 are the lean target excess air ratio λt and the rich target excess air ratio λt, respectively. The command value IT is found by using this ratio to interpolate between the basic target injection timing value ITL for lean operation and the basic target injection timing value ITR for rich operation. This method is expressed with computational equations as follows.

Excess air ratio λ deviation:$R\_Lambda=(La-L2)/(L1-L2)$

Injection timing command value:$IT=(ITL-ITR)R\_Lambda+ITR$

By revising the fuel injection timing using interpolation, the fuel injection timing command value IT can be changed according to the change in the actual excess air ratio λr during the period when the actual excess air ratio λr is undergoing a large change from the lean target value to the rich target value. As a result, the fuel injection timing can be set appropriately with respect to the response delay of the actual excess air ratio λr caused by the intake air transport delay that occurs when the target excess air ratio λt value changes. Thus, the sudden changes in the fuel injection timing can be suppressed and torque fluctuations can be alleviated.

Figure 10:
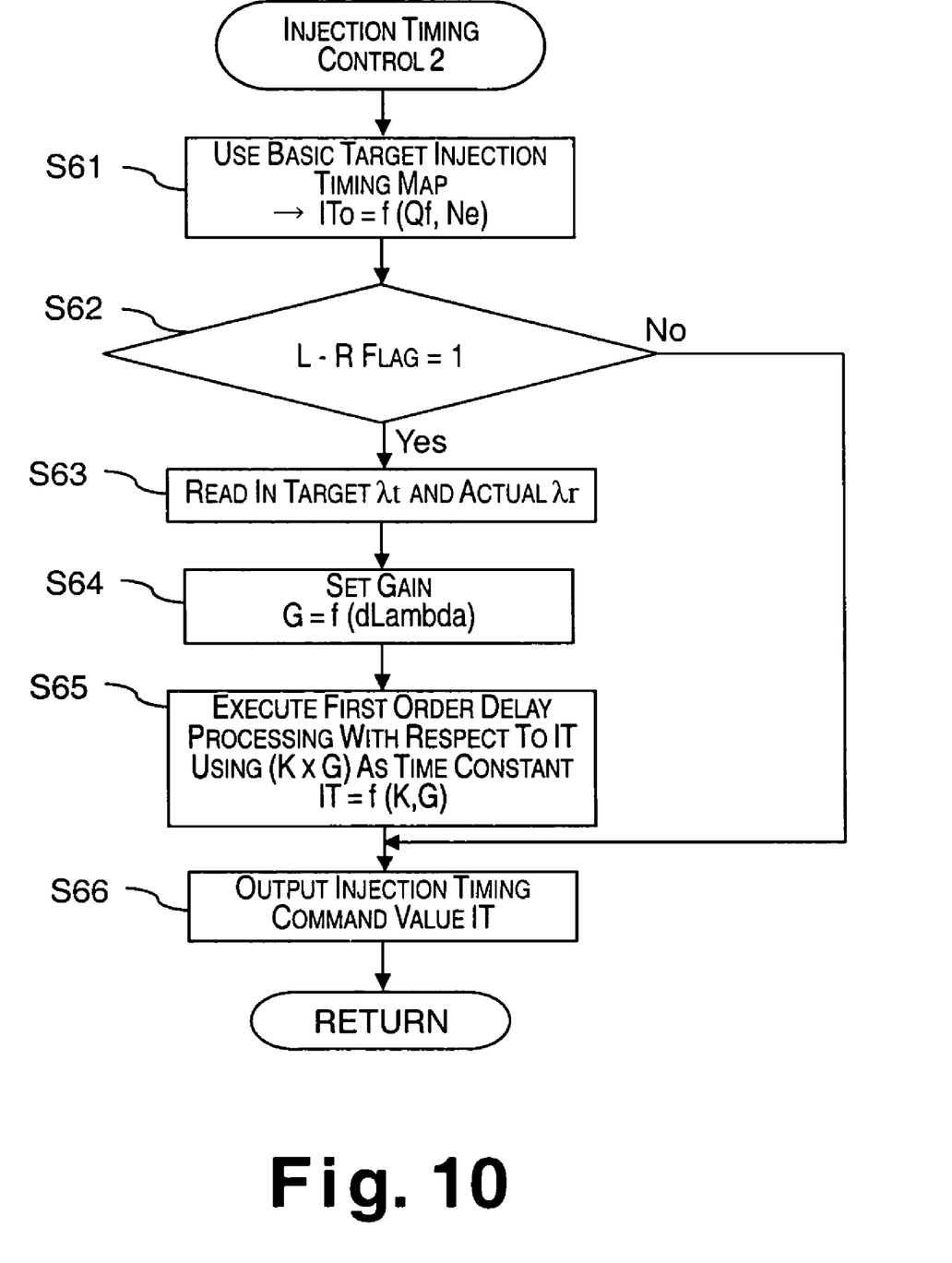
FIG. 10 is a flowchart showing the control operations of a fuel injection timing adjustment control executed by the control unit of an engine fuel injection control apparatus or system in accordance with a second embodiment of the present invention when the excess air ratio is changing rapidly.

FIG. 10 shows a second method of revising the fuel injection timing when the excess air ratio λ changes suddenly. With this method, the fuel injection timing is made to follow the actual excess air ratio λr by revising the basic target fuel injection timing using a first order delay filter.

In step S61, the control unit 20 obtains the basic target fuel injection timing value ITo based on the engine operating state by searching a pre-stored map. In step S62, the control unit 20 checks the status of the L-R flag. If the value of the L-R flag is 0, then, the control unit 20 proceeds to step S66 and outputs the basic target fuel injection timing value ITo as the injection timing command value IT.

If the value of the L-R flag is 1, the control unit 20 reads in the target excess air ratio λt and the actual excess air ratio λr in step S63 and sets the gain G, i.e., time constant, of the first order delay processing based on the difference dLambda between the target excess air ratio λt and the actual excess air ratio λr in step S64. The gain G is set, for example, by searching a pre-stored map that gives the gain G based on the difference dLambda.

In step S65, the control unit 20 executes a first order delay processing that uses the product of the gain G and a coefficient K as the time constant to adjust the basic target injection timing value ITo. In step S66, the control unit 20 outputs the result of the adjustment as the injection timing command value IT. The coefficient K is an adjustment coefficient determined based on the transport delay characteristic of the engine air intake system and is set, for example, by searching a pre-stored map that gives the coefficient K based on the intake air quantity and the engine rotational speed.

By executing the processing just described, the fuel injection timing can be changed according to an appropriate characteristic that reflects the actual excess air ratio and the air intake characteristic of the engine during the transient period.

Figure 11:
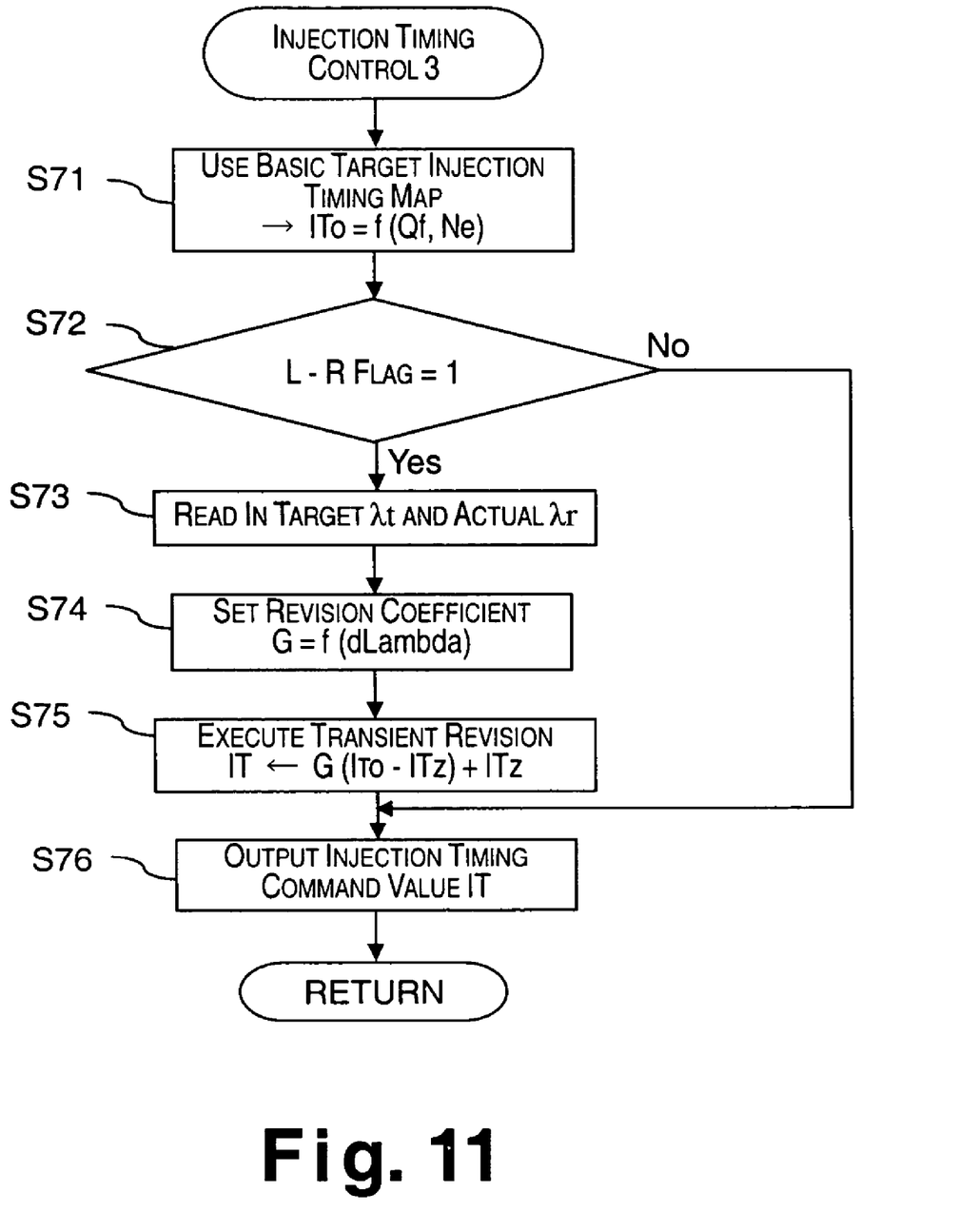
FIG. 11 is a flowchart showing the control operations of a fuel injection timing adjustment control executed by the control unit of an engine fuel injection control apparatus or system in accordance with a third embodiment of the present invention when the excess air ratio is changing rapidly.

FIG. 11 shows a third method of revising the fuel injection timing when the excess air ratio λ changes suddenly. This method improves the accuracy with which the fuel injection timing is made to follow the actual excess air ratio λr by dampening the rate of change of the basic target fuel injection timing using the previous control value. Steps S71, S72, and S76 are the same as steps S61, S62, and S66. When the L-R flag is 0, the basic target injection timing value ITo is obtained by searching a pre-stored map and then outputted as the injection timing command value IT.

If the value of the L-R flag is 1, then the control unit 20 reads in the target excess air ratio λt and the actual excess air ratio λr in step S73 and sets an adjustment coefficient $G(G \leq 1)$ based on the difference dLambda between the target excess air ratio λt and the actual excess air ratio λr in step S74. The adjustment coefficient G is set, for example, by searching a pre-stored map that gives the coefficient G based on the difference dLambda.

In step S75, the control unit 20 calculates the adjusted fuel injection timing value IT by multiplying the difference between the target injection timing value ITo of the current cycle and the injection timing command value ITz of the previous cycle by the adjustment coefficient G (which is determined using the actual excess air ratio λr) and adding the injection timing command value ITz of the previous cycle to the resulting product. This processing is expressed by the following equation:

$IT \leftarrow G(ITo-ITz)+ITz$

In step S76, the control unit 20 outputs the result of the adjustment as the injection timing command value IT. This method uses an adjustment coefficient based on the actual excess air ratio λr to dampen the rate of change of the target fuel injection timing and thereby achieve a fuel injection timing change characteristic that matches the change in the actual excess air ratio λr.

The embodiments described heretofore are examples of revising the fuel injection timing in accordance with the change in the excess air ratio that occurs when rich spike control is executed for the purpose of regenerating a NOx trapping catalytic converter. However, the present invention is not limited to such examples and can be applied effectively to basically any situation involving an operating state in which the excess air ratio changes rapidly, e.g., an operating state in which the exhaust gas is controlled to a high temperature in order to regenerate a DPF.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-283787. The entire disclosure of Japanese Patent Application No. 2003-283787 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine fuel injection control apparatus for an engine comprising:
    an excess air ratio control section configured to control an excess air ratio to a target excess air ratio that is determined based on an engine operating condition of the engine;
    a fuel injection timing control section configured to control a fuel injection timing to a target fuel injection timing that is determined based on the engine operating condition;
    an actual excess air ratio computing section configured to compute an actual excess air ratio of the engine; and
    a fuel injection timing adjustment section configured to adjust the fuel injection timing to obtain an adjusted fuel injection timing by interpolating in accordance with a ratio of the actual excess air ratio with respect to the target excess air ratio in effect before the adjustment in the target excess air ratio and the target excess air ratio that will take effect after the adjustment in the target excess air ratio such that the fuel injection timing is concurrently adjusted in a direction that corresponds to a direction of change in the actual excess air ratio when an amount of adjustment in the target excess air ratio is larger than a prescribed value, the fuel injection timing adjustment section being further configured to adjust the fuel injection timing when rich spike control is being executed for regenerating a NOx trapping catalytic converter provided in an engine exhaust system.

2. The engine fuel injection control apparatus as recited in claim 1, wherein
    the excess air ratio control section is configured to detect a fuel injection quantity and an engine rotational speed as the engine operating condition, and to set the target excess air ratio by using a map configured to provide the target excess air ratio corresponding to the fuel injection quantity and the engine rotational speed that were detected.

3. The engine fuel injection control apparatus as recited in claim 1, wherein
    the excess air ratio control section is configured control the excess air ratio by adjusting an opening degree of a throttle valve installed in an air intake passage for adjusting an intake air quantity.

4. The engine fuel injection control apparatus as recited in claim 1, wherein
    the excess air control section is configured to control the excess air ratio by using a first excess air ratio map configured to provide a lean target value corresponding to the engine operating condition for lean operation, and using a second excess air ratio map configured to provide a rich target value corresponding to the engine operation condition for rich operation.

5. The engine fuel injection control apparatus as recited in claim 4, wherein
    the fuel injection timing control section is configured to control the fuel injection timing by using a first injection timing map to provide a lean target value corresponding to lean operation, and using a second injection timing map configured to provide a rich target value corresponding to the engine operating condition for rich operation.

6. The engine fuel injection control apparatus as recited in claim 1, wherein
    the fuel injection timing control section is configured to control the fuel injection timing by using a first injection timing map to provide a lean target value corresponding to lean operation, and using a second injection timing map configured to provide a rich target value corresponding to the engine operating condition for rich operation.

7. The engine fuel injection control apparatus as recited in claim 1, wherein
    the excess air control section is configured to control the excess air ratio by using a first excess air ratio map configured to provide a lean target value corresponding to the engine operating condition for lean operation, and using a second excess air ratio map configured to provide a rich target value corresponding to the engine operation condition for rich operation.

8. The engine fuel injection control apparatus as recited in claim 7, wherein
    the fuel injection timing control section is configured to control the fuel injection timing by using a first injection timing map to provide a lean target value corresponding to lean operation, and using a second injection timing map configured to provide a rich target value corresponding to the engine operating condition for rich operation.

9. The engine fuel injection control apparatus as recited in claim 1, wherein
    the fuel injection timing control section is configured to control the fuel injection timing by using a first injection timing map to provide a lean target value corresponding to lean operation, and using a second injection timing map configured to provide a rich target value corresponding to the engine operating condition for rich operation.

10. The engine fuel injection control apparatus as recited in claim 1, wherein
the fuel injection timing control section is configured to set the fuel injection timing and the fuel injection quantity of the fuel according to an injection valve opening timing and a fuel injection valve opening duration.

11. An engine fuel injection control apparatus for an engine comprising:
an excess air ratio control section configured to control an excess air ratio to a target excess air ratio that is determined based on an engine operating condition of the engine;
a fuel injection timing control section configured to control a fuel injection timing to a target fuel injection timing that is determined based on the engine operating condition;
an actual excess air ratio computing section configured to compute an actual excess air ratio of the engine; and
a fuel injection timing adjustment section configured to adjust the fuel injection timing to obtain an adjusted fuel injection timing by interpolating in accordance with a ratio of the actual excess air ratio with respect to the target excess air ratio in effect before the adjustment in the target excess air ratio and the target excess air ratio that will take effect after the adjustment in the target excess air ratio such that the fuel injection timing is concurrently adjusted in a direction that corresponds to a direction of change in the actual excess air ratio when an amount of adjustment in the target excess air ratio is larger than a prescribed value, the fuel injection timing adjustment section being further configured to adjust the fuel injection timing when exhaust gas temperature-increasing control is being executed for the regenerating an exhaust gas fine particle filter provided in an engine exhaust system.

12. An engine fuel injection control apparatus for an engine comprising:
excess air ratio control means for controlling an excess air ratio to a target excess air ratio that is determined based on an engine operating condition of the engine;
fuel injection timing control means for controlling a fuel injection timing to a target fuel injection timing that is determined based on the engine operating condition;
actual excess air ratio computing means for computing an actual excess air ratio of the engine; and
fuel injection timing adjustment means for adjusting the fuel injection timing to obtain an adjusted fuel injection timing by interpolating in accordance with a ratio of the actual excess air ratio with respect to the target excess air ratio in effect before the adjustment in the target excess air ratio and the target excess air ratio that will take effect after the adjustment in the target excess air ratio such that the fuel injection timing is concurrently adjusted in a direction that corresponds to a direction of change in the actual excess air ratio when an amount of adjustment in the target excess air ratio is larger than a prescribed value, the fuel injection timing adjustment means further includes a function for adjusting the fuel injection timing when rich spike control is being executed for regenerating a NOx trapping catalytic converter provided in an engine exhaust system.

13. A method for controlling a fuel injection system for an engine comprising:
controlling an excess air ratio to a target excess air ratio that is determined based on an engine operating condition of the engine;
controlling a fuel injection timing to a target fuel injection timing that is determined based on the engine operating condition;
computing an actual excess air ratio of the engine; and
adjusting the fuel injection timing to obtain an adjusted fuel injection timing by interpolating in accordance with a ratio of the actual excess air ratio with respect to the target excess air ratio in effect before the adjustment in the target excess air ratio and the target excess air ratio that will take effect after the adjustment in the target excess air ratio such that the fuel injection timing is concurrently adjusted in a direction that corresponds to a direction of change in the actual excess air ratio when an amount of adjustment in the target excess air ratio is larger than a prescribed value, the adjusting of the fuel injection timing including adjusting the fuel injection timing when rich spike control is being executed for regenerating a NOx trapping catalytic converter provided in an engine exhaust system.

* * * * *